United States Patent [19]
Tokuno

[11] 3,974,921
[45] Aug. 17, 1976

[54] BOARD PILING APPARATUS

[75] Inventor: Masateru Tokuno, Nishinomiya, Japan

[73] Assignee: Rengo Co., Ltd., Osaka, Japan

[22] Filed: May 29, 1975

[21] Appl. No.: 581,734

[30] Foreign Application Priority Data
Dec. 18, 1974 Japan............................ 49-145914

[52] U.S. Cl. ................................. 214/7; 198/235; 198/285; 214/1 Q; 271/150
[51] Int. Cl.² ....................................... B65G 57/28
[58] Field of Search ............... 214/1 Q, 1 QA, 6 C, 214/7; 198/35, 235, 283, 284, 285; 93/93 R, 93 DP; 271/65, 149, 150, 151, 186

[56] References Cited
UNITED STATES PATENTS

| | | | |
|---|---|---|---|
| 3,142,388 | 7/1964 | Cole | 93/93 DP X |
| 3,236,162 | 2/1966 | Reist | 93/93 DP |
| 3,501,036 | 3/1970 | Calistrat | 214/152 |
| 3,884,345 | 5/1975 | Tokuno | 198/35 |

Primary Examiner—L. J. Paperner
Attorney, Agent, or Firm—Birch, Stewart, Kolasch & Birch

[57] ABSTRACT

This invention relates to a board piling apparatus whereby the boards such as for example corrugated cardboards delivered individually or in small bundles in a flatly laid state are raised up and collected and the collected boards are then turned about 90° and stacked up in the form of a pile. This apparatus is particularly featured by incorporation of a board raising up device adapted for raising up the board which are fed in a flatly laid state.

3 Claims, 6 Drawing Figures

BOARD PILING APPARATUS

This invention relates to a board piling or stacking up apparatus whereby the boards such as for example corrugated cardboards delivered individually or in small bundles in a flatly laid state are raised up and collected and the collected boards are turned about 90° and stacked up in a pile, said apparatus featuring particularly incorporation of a board raising up device adapted for raising up the boards which are fed in a flatly laid state.

In most of the conventional board piling apparatus of this type, the board delivered individually or in small bundles in a flatly laid state are received onto a suitable conveyor and raised up on said conveyor by workers, and the raised up boards are then placed on a transport conveyor and propped up by one of the board supports on said transport conveyor. Each of said board supports is connected to an endless carrier member in the transport conveyor so as to be movable with said member. This board support is arranged to move slightly forwardly upon placing of the boards on the transport conveyor, and when a predetermined number of boards are placed on the transport conveyor, this lot of boards is carried to the delivery end of the conveyor and turned about 90° thereat by a turn-over means to form a pile of boards. This pile of boards is either transferred onto a discharge conveyor directly from said turnover means or pushed out from said turnover means by a pusher provided in said means. However, these conventional piling apparatus were very poor in operating efficiency as the boards delivered individually or in small bundles in a flatly laid state must be raised up on the conveyor by human hands.

The primary object of the present invention is to provide a board piling apparatus equipped with a board raising up device whereby each of the boards delivered in a flat state can be raised up mechanically by lifting up either the leading end or the trailing end of each board so that the boards may be stacked up with their sides reversed alternately or every several boards so as to prevent the respective boards from being warped during storage in the form of a pile.

Other objects, features and advantages of the invention will be readily apparent from the following description of certain preferred embodiments thereof, taken in conjunction with the accompanying drawings, in which.

Figure 1:
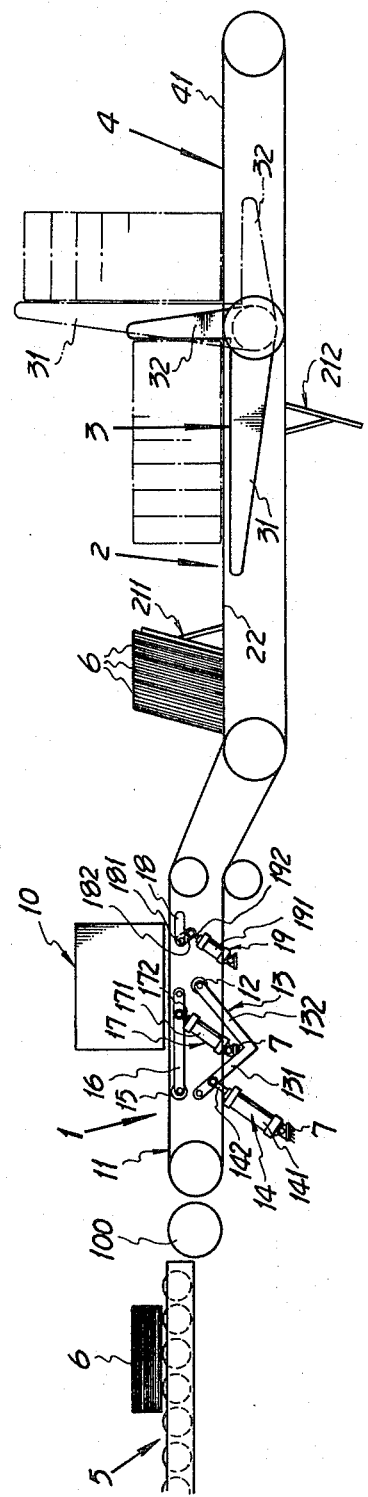
FIG. 1 is a schematic side elevation of an apparatus according to the present invention.
Figure 3:
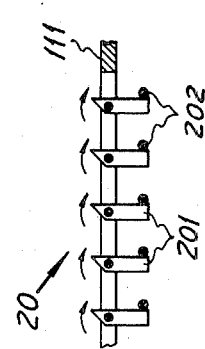
FIG. 3 is a schematic drawing showing the board holding means.
Figure 2:
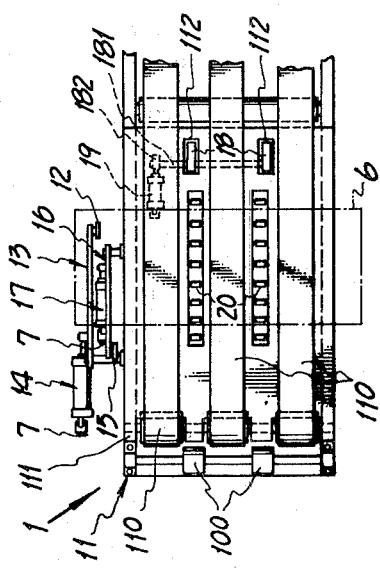
FIG. 2 is a plane view of the essential parts of the board raising up mechanism.

The invention is first described by way of a preferred ebmodiment thereof with reference to FIGS. 1 to 5 of the drawings. As apparent from FIG. 1, the board piling apparatus according to the instant embodiment of the invention comprises essentially a board raising up device 1 whereby each small bundle of boards, or board block 6, delivered in a flatly laid state by a roller conveyor 5 is raised up, a board edge trueing up plate 10 provided uprightly on the outside of said board raising up device 1 for trueing up the edges of the boards by hitting an end of the raised up board block 6 against said plate, a transport conveyor 2 provided with two board supports 211 and 212, whereby a predetermined number of boards raised up by said device 1 are transported to the delivery end of the conveyor by supporting said board by said support 211 or 212, a turn-over means 3 whereby an aggregation of the raised up boards on the transport conveyor 2 is scooped up and turned about 90° to form a pile of boards, and a discharge conveyor 4 for discharging said pile of boards.

The board raising up device 1 comprises a conveyor 11 having several conveyor belts 110 arranged parallel to each other, each of said belts having a horizontal carriage section designed for receiving each board block 6 from the roller conveyor 5 in the form as it is and a slant carriage section continuous to said horizontal section, a first lever 13 having its one end pivotted to a side of a conveyor frame 111 at a position lower than the horizontal carriage plane of said conveyor 11, with a freely rotatable roll 12 being mounted at the other end of said lever, an air cylinder 14 for operating said lever 13, a second lever 16 having its one end pivotted to a side of the conveyor frame 111 at a position lower than the horizontal carriage plane of said conveyor 11, with a freely rotatable roll 15 being mounted at the other end of said lever 16, an air cylinder 17 for operating said second lever 16, a pair of board holding levers 18 each of which is positioned lower than the horizontal carriage plane of the conveyor 11 and has its one end pivotally secured to the conveyor frame 111 by a shaft 181 at a position slightly closer to the delivery end of the conveyor than the pivotted point of said first lever 16, an air cylinder 19 adapted for rotating said shaft 181 through an arm 182 secured to said shaft so as to turn said levers 18, and checking or holding means 20 provided in the conveyor frame 111 on both external sides of the central conveyor belt 110. The conveyor belts 110 are driven by a suitable driving means (not shown). As apparent from FIG. 3, each said holding means 20 consists of a plurality of members 201 arranged in the direction of movement of the conveyor and pivotally secured to the conveyor frame 111 such that the top end of each of said members 201 projects slightly upwardly from the carrying surface of the conveyor. Each said member 201 is arranged such that its upper end portion is turned by an external force in the conveyor moving direction to fall below the carrying surface of the conveyor, but when it receives an external force in the opposite direction, it is held back from turning as its lower end portion abuts against a stopper 202. When no external force is exerted to said member 201, it maintains, for its own weight, the vertical position with its upper end projecting out from the carrying surface of the conveyor. Said first lever 13 consists of a bar 131 extending in the direction of the discharge end from the feed end of the conveyor 11, and a bar 132 extending upwardly from the end of said bar 131 by making a right angle with said bar 131 and carrying a roll 12 at its end. The cylinder tube 141 of the air cylinder 14 is pivotally secured to the base 7 while the piston rod 142 is pivotally joined to the lever 13 so that when the piston rod 142 remains retracted in the tube 141, the lever 13 stays at its position below the carrying surface of the conveyor, but when the piston rod 142 projects out, the lever 13 turns counterclockwise in the drawing and the bar 132 emerges substantially vertically above the carrying surface of the conveyor. On the other hand, the cylinder tube 171 of the air cylinder 17 is pivotally secured to the base 7 and the piston rod 172 thereof is pivotally joined to the lever 16 so that when the piston rod 172 remains retracted in the tube 171, the lever 16 stays at its position below the carrying surface of the conveyor but when the piston rod 172 projects out, said lever 16 turns clockwise in the drawing to emerge above the carrying surface of the conveyor 11. The cylinder tube 191 of the air cylinder 19 is pivotally secured to the conveyor frame 111 and its piston rod 192 is pivotally joined to the lower end of the arm 182 so that when the piston rod 192 remains retracted in the tube 191, the levers 18 stay at their positions below the carrying surface of the conveyor 11 but when the piston rod 192 projects out from the tube 191, said levers 18 turn counterclockwise in the drawing to emerge above the carrying surface of the conveyor from the opening 112 in the conveyor frame 111.

Said transport conveyor 2 includes parallel conveyor belts 22 each of which is formed from an endless chain provided with struts, and two board supports 211 and 212 are secured to each said belt 22 at the interval of half length of the belt so that they make circulating movement with said belt 22. These conveyor belts 22 are driven by a suitable driving means (not shown). The discharge end of the conveyor 11 and the feed end of the conveyor 2 overlaps each other so that the boards will not drop at the joint of said two conveyors.

The discharge conveyor 4 consists of parallel conveyor belts 41 each of which is formed from an endless chain provided with struts, and the feed end of the conveyor 4 overlaps with the delivery end of the conveyor 2. These conveyor belts 41 are driven by a suitable driving means (not shown). The turn-over means 3 consists of an assembly of fork-shaped supporting bars 31 on which the blocks of raised-up boards are arranged in order and rested and another assembly of fork-shaped rack 32 on which said blocks of boards are piled up. These two assemblies of supporting bars are joined at their corresponding ends substantially vertically to each other and arranged to be turned by a suitable driving means (not shown) about the joint at the delivery end of the transport conveyor 2. The fork-shaped supporting bars 31 can turn from their normal laid-down position below the conveyor 2 to a substantially vertical position above the conveyor 2 by passing between the carriage belts 22 of the conveyor 2, while the board piling-up bars 32 are able to turn from their substantially vertical position to the laid-down position below the conveyor 4 by passing between the carriage belts 41 of the conveyor 4.

Now the operation for piling up the board blocks 6 by using the above-described board piling apparatus of the present invention is described.

Figure 4:
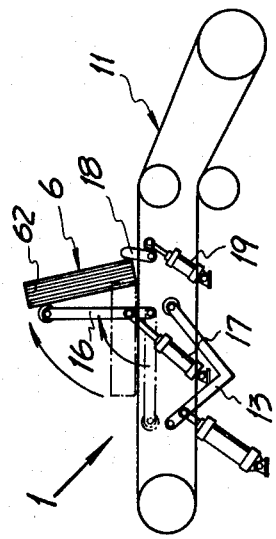
FIGS. 4 and 5 are drawings illustrating the operation of the board raising up mechanism.
Figure 5:
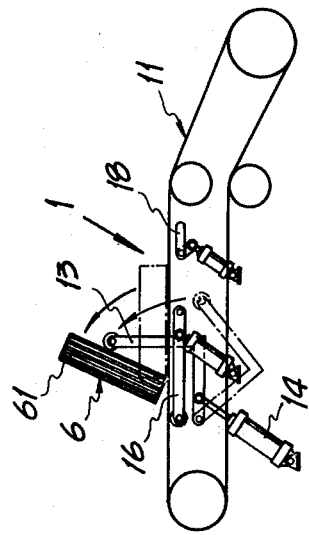

Each board block 6 delivered by the roller conveyor 5 is transferred onto the conveyor 11 by drawout rolls 100 which are rotated by a suitable driving means (not shown). The board block 6 on the conveyor 11 is raised up either with the feeding end 61 thereof being lifted up by counterclockwise turn of the lever 13 by the operation of the air cylinder 13 as shown in FIG. 4 or with the trailing end 62 being lifted up by turn of the lever 16 by the operation of the air cylinder 17 as shown in FIG. 5. When the board block 6 is raised up by the lever 13, the lower end of said board block 6 is checked or held by the members 201 of the holding means 20 to prevent skidding of the lower end of the block 6. On the other hand, when the board block 6 is raised up by the lever 16, the levers 18 project out above the conveyor 11 by counterclockwise turn of the levers 18 by the operation of the air cylinder 19, so that the lower end of the board block 6 is held by the levers 18 to prevent said block 6 from being again laid down flat by movement of the conveyor 11. When the board block 6 is duly raised up, the lever 13 or the levers 16 and 18 return to the original positions. The board block 6 which has thus been raised up on the conveyor 11 is then hit against an edge truing-up plate 10 by a worker to true up the edges of the boards, and then said board block while maintained at this state by a very slight assistance of the worker is carried on the slant section of the conveyor 11 and then propped up against a board support 211 on the transport conveyor 2. Said board support 211 advances a distance equal to the thickness of one board block upon arrival of every board block 6 thereat. When a predetermined number of board blocks 6 are placed on the transport conveyor 2, these board blocks are quickly transferred to the delivery end of said conveyor 2, whereat they are turned about 90° upwardly by the turn-over means 3 to form a pile of boards, and such pile of boards is then placed on the discharge conveyor 4. By the time when one of the board supports 211 reaches the delivery end of the conveyor 2, another board support 212 will have been carried to the feed end of the conveyor 2 to stay ready for the next board block transferring operation.

Figure 6:
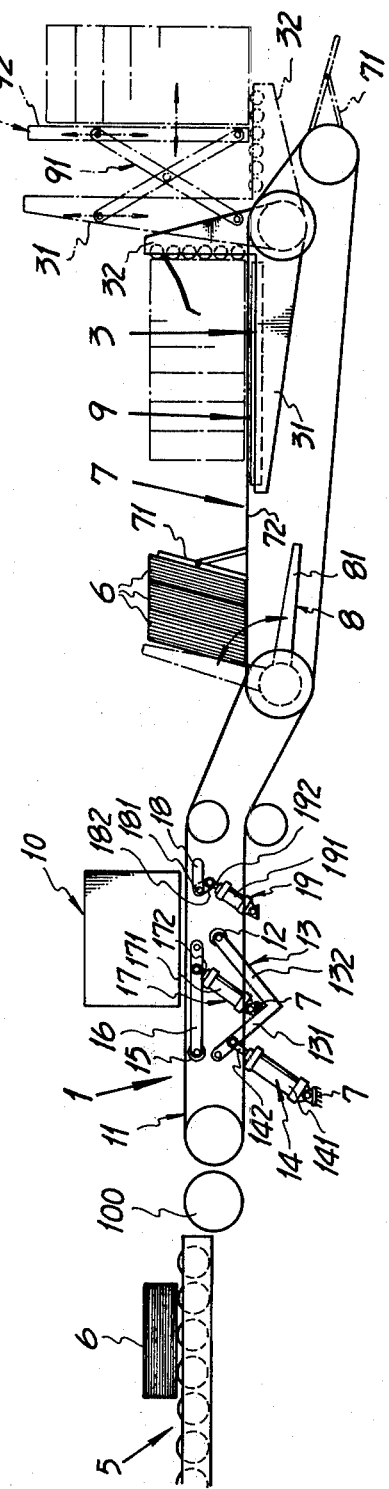
FIG. 6 is a schematic side elevation of the piling apparatus according to another embodiment of the present invention.

Referring now to FIG. 6, there is shown a board piling apparatus according to another embodiment of the present invention. This board piling apparatus comprises a board raising up device 1, and edge truingup plate 10, a transport conveyor 7 provided with board supports 71, a stopper means 8 provided at the feed end of said transport conveyor 7, a turn-over means 3 provided at the delivery end of said conveyor 7, and a pusher 9 provided in said turn-over means 3. The board raising up device 1, edge truing-up plate 10 and turn-over means 3 are same in construction and function as the counterparts in the embodiment shown in FIG. 1. The transport conveyor 7 is provided with parallel carriage belts 72 each of which is formed from an endless chain provided with struts, and the board supports 71 are joined to each said carriage belt 72 so that said supports can make reciprocating movement with said belt 72. These carriage belts 72 are driven by a suitable driving means (not shown). The feed end of said conveyor 7 overlaps with the meeting end of the conveyor 11. The stopper means 8 consists of parallel bars 81 pivotally secured to the feed end of the conveyor 7 and turned by a suitable driving means (not shown). Said bars 81 can turn from the laid-down position below the conveyor 7 to a substantially vertical position above the delivery end of the conveyor 11 by passing between the carriage belts 72 of the conveyor 7. The pusher 8 is constituted from bar members 92 which are joined to the raised-up board supporting bars 31 of the turn-over means 3 by means of X-shaped extendable-contractable members 91 and can move from the retracted position in the supporting bar assembly 31 to the end of the assembly of board piling bars 32 while maintaining the posture parallel to the bar assembly 31 by a suitable driving means (not shown). It is desirable to mount the freely rotatable rollers on the supporting bars 32 to facilitate pushing of the boards on said bars 32 by said pusher 9.

In operation, when a predetermined number of board blocks 6 are raised up and arranged in order on the conveyor while supported by a board support 71 in the same way as the embodiment of FIG. 1, these board blocks 6 are quickly transferred to the delivery end of the conveyor and turned thereat about 90° by the turn-over means 3 to form a pile of boards, and such pile of boards is then pushed out from said turn-over means 3 by the pusher 9. During the time when the board support 71 stays at the delivery end of the conveyor, the stopper means 8 remains at its vertically raised up position above the feed end of the conveyor 7 to hold the next lot of board blocks 6 until the board support 71 returns to the lead-in end of the conveyor 7.

What is claimed is:

1. A board piling apparatus whereby the board delivered individually or in small bundles in a flatly laid-down state are raised up and collected in a lot and the collected boards are then turned about 90° to form a pile of boards, characterized by incorporation of a board raising-up device comprisng a conveyor by which said boards delivered in a flatly laid-down state are received in the form as they are, a first lever pivotally supported at a position lower than the carriage surface of said conveyor, means for turning said first lever so that the first lever rises up above the carriage surface of said conveyor to lift up the leading end of the board and raise up the board on said conveyor and thereafter said first lever falls down below the carriage surface of said conveyor, a second lever pivotally supported at a position lower than the carriage surface of said conveyor, means for turning said second lever so that the second lever rises up above the carriage surface of said conveyor to lift up the trailing end of the board and raise up the board on said conveyor and thereafter said second lever falls down below the carriage surface of said conveyor, a board holding lever pivotally supported at a position below the carriage surface of said conveyor and slightly closer to the delivery end of said conveyor than the pivotted point of said second lever, and means for turning said board holding lever so that the board holding lever rises up above the carriage surface of said conveyor so as to hold the lower end of the board raised up by said second lever and thereafter said board holding lever falls down below the carriage surface of said conveyor.

2. A board piling apparatus according to claim 1, wherein said first lever consists of a first bar portion extending in the direction of the delivery end of said conveyor from the feed end of said conveyor and a second bar portion extending upwardly from the end of the said first bar portion substantially vertically thereto and carrying a freely rotatable roll at its end, and said second lever carries a freely rotatable roll at its end.

3. A board piling apparatus according to claim 1, wherein the means for turning said first lever, said second lever and said board holding lever are pistoncylinder devices.

* * * * *